US012207380B2

(12) United States Patent
Boehme et al.

(10) Patent No.: US 12,207,380 B2
(45) Date of Patent: Jan. 21, 2025

(54) SYSTEM FOR CONTROLLING A HIGH VOLTAGE FOR X-RAY APPLICATIONS, AN X-RAY GENERATION SYSTEM, AND A METHOD FOR CONTROLLING A HIGH VOLTAGE

(71) Applicant: Siemens Healthcare GmbH, Erlangen (DE)

(72) Inventors: Andreas Boehme, Nuremberg (DE); Henning Braess, Uttenreuth (DE)

(73) Assignee: Siemens Healthineers AG, Forchheim (DE)

( * ) Notice: Subject to any disclaimer, the term of this patent is extended or adjusted under 35 U.S.C. 154(b) by 137 days.

(21) Appl. No.: 17/475,501

(22) Filed: Sep. 15, 2021

(65) Prior Publication Data

US 2022/0104334 A1 Mar. 31, 2022

(30) Foreign Application Priority Data

Sep. 25, 2020 (DE) ..................... 10 2020 212 085.4

(51) Int. Cl.
*H05G 1/32* (2006.01)
*H05G 1/20* (2006.01)

(52) U.S. Cl.
CPC ................. *H05G 1/32* (2013.01); *H05G 1/20* (2013.01)

(58) Field of Classification Search
CPC ............... H05G 1/20; H05G 1/22; H05G 1/32
See application file for complete search history.

(56) References Cited

U.S. PATENT DOCUMENTS 4,309,612 A * 1/1982 Aichinger ................ H05G 1/20 378/108
4,573,184 A * 2/1986 Tanaka ..................... H05G 1/34 363/28
4,601,051 A * 7/1986 Santurtun ................ H05G 1/32 378/118
4,614,999 A 9/1986 Onodera et al.
4,641,330 A * 2/1987 Herwig ............... H02M 3/3376 363/41
4,768,216 A * 8/1988 Harvey .................. H05G 1/265 378/112
5,243,509 A * 9/1993 Laeuffer .................. H05G 1/20 363/17
5,602,897 A * 2/1997 Kociecki .................. H05G 1/20 378/111

(Continued)

FOREIGN PATENT DOCUMENTS

DE 2846458 A1 5/1980
DE 102014202954 A1 8/2015
JP H0414800 A 1/1992

OTHER PUBLICATIONS

German Office Action mailed Apr. 30, 2021.

*Primary Examiner* — Dani Fox
*Assistant Examiner* — Soorena Kefayati
(74) *Attorney, Agent, or Firm* — Hamess, Dickey & Pierce, P.L.C.

(57) ABSTRACT

A system is for controlling a high voltage for x-ray applications. In an embodiment, the system includes a controller including at least one input for a mains input voltage, and one output for outputting a primary-side transformer current; and a distance compensation suited to providing the primary-side transformer current with a determined pulse frequency or a determined pulse length.

20 Claims, 1 Drawing Sheet

(56) References Cited

U.S. PATENT DOCUMENTS

| | | | | |
|---|---|---|---|---|
| 6,738,275 | B1 * | 5/2004 | Beland | H02M 3/3376 363/21.02 |
| 2002/0067631 | A1 * | 6/2002 | Lunding | H05G 1/10 363/131 |
| 2003/0210764 | A1 * | 11/2003 | Tekletsadik | H05G 1/20 378/106 |
| 2004/0017893 | A1 * | 1/2004 | Beyerlein | H05G 1/20 378/111 |
| 2004/0247080 | A1 * | 12/2004 | Feda | H05G 1/30 378/101 |
| 2011/0002446 | A1 * | 1/2011 | Beland | H05G 1/32 378/111 |
| 2011/0103552 | A1 * | 5/2011 | Walk | H05G 1/58 378/112 |
| 2012/0163546 | A1 * | 6/2012 | Striker | H05G 1/46 378/110 |
| 2014/0140474 | A1 * | 5/2014 | Caruso | G01N 23/02 378/53 |
| 2015/0093013 | A1 * | 4/2015 | Morita | A61B 6/5205 382/132 |
| 2015/0236600 | A1 * | 8/2015 | Waffler | H02M 3/01 363/21.02 |
| 2016/0088718 | A1 * | 3/2016 | Jiang | H05G 1/30 378/110 |
| 2017/0223814 | A1 * | 8/2017 | Matilaine | H05G 1/34 |
| 2017/0295634 | A1 * | 10/2017 | Garcia Tormo | H05G 1/12 |
| 2018/0235063 | A1 * | 8/2018 | Garcia Tormo | H02M 3/156 |
| 2019/0058404 | A1 * | 2/2019 | Gadenne | H05G 1/32 |
| 2019/0387602 | A1 * | 12/2019 | Woywode | H05G 1/32 |

* cited by examiner

SYSTEM FOR CONTROLLING A HIGH VOLTAGE FOR X-RAY APPLICATIONS, AN X-RAY GENERATION SYSTEM, AND A METHOD FOR CONTROLLING A HIGH VOLTAGE

PRIORITY STATEMENT

The present application hereby claims priority under 35 U.S.C. § 119 to German patent application number DE 102020212085.4 filed Sep. 25, 2020, the entire contents of which are hereby incorporated herein by reference.

FIELD

Example embodiments of the invention generally relate to a system for controlling a high voltage for x-ray applications, an x-ray generation system, and a method for controlling a high voltage. In particular, example embodiments of the invention relates to a controlled distance compensation for an inverter with non-linear behavior of the controlled system, e.g. an LCLC resonant converter.

BACKGROUND

For x-ray applications in particular in the medical field, it is necessary for the high voltage to be developed as quickly and precisely as possible. The system should in particular both manage without upstream connection of a mains adjustment transformer and also permit higher switching frequencies.

The following boundary conditions should be observed in the system. The typical mains voltage has a relatively broad range, e.g. of 380V to 480V alternating voltage. The system should be usable for different x-ray generators. In particular, different generators spread regarding the oscillating circuit properties so that the resonance region in particular shifts. Furthermore, the length of a high voltage cable also has an influence on the output signal e.g. as a result of the capacitance of the cable in relation to the actual x-ray generator. Moreover, the system should be as load-independent as possible, which results in voltage losses in the case of conventional systems.

According to the prior art, it is known firstly to generate a transformed current from an input variable E1 via a controller 1, which current is input into a pulse generator 3 as an input variable E3. The pulse generator 3 in turn generates a pulsed signal, which is input into an x-ray generator as an input variable E4. The actual x-ray tube is connected to the x-ray generator, with the aid of which x-ray radiation is generated.

The x-ray generator typically comprises an inverter, which can be embodied as shown in DE 10 2014 202 954 A1.

SUMMARY

At least one embodiment of the invention specifies a system for controlling a high voltage for x-ray applications, an x-ray generation system and/or a method for controlling a high voltage, which allows a high voltage to develop rapidly and precisely.

Expedient embodiments result from the respective claims.

At least one embodiment of the inventive system for controlling a high voltage for x-ray applications comprises a controller which has at least one input for a mains input voltage, and one output for outputting a primary-side transformer current. The system furthermore has a distance compensation, which is suited to providing the primary-side transformer current with a predetermined pulse frequency or a predetermined pulse length.

At least one embodiment of the inventive x-ray generation system comprises at least one embodiment of the inventive system and furthermore a pulse generator and an x-ray beam generator.

The inventive method of at least one embodiment for controlling a high voltage, in particular for an x-ray beam generator, comprises:

- controlling a primary-side transformer current with a controller starting from a mains input voltage and a target voltage,
- looking up a pulse frequency or a pulse length, and
- compensating for the primary-side transformer current with the looked-up pulse frequency or the downstream pulse length.

At least one embodiment of the inventive system for controlling a high voltage for x-ray applications, comprises:

- a controller, including at least one input for a mains input voltage and one output for outputting a primary-side transformer current; and
- a distance compensation, suited to providing the primary-side transformer current with a pulse frequency or a pulse length.

At least one embodiment of the inventive method for controlling a high voltage, in particular for an x-ray beam generator, comprises:

- controlling a primary-side transformer current with a controller starting from a mains input voltage and a target voltage;
- looking up a pulse frequency or a pulse length; and
- compensating for the primary-side transformer current with the pulse frequency looked-up or the pulse length looked-up.

At least one embodiment of the inventive method further comprises:

- selecting a conversion chart by reading out a pulse frequency in a case of a threshold calibration transformer current.

BRIEF DESCRIPTION OF THE DRAWINGS

The afore-described properties, features and advantages of this invention and the manner in which these are achieved will become clearer and more intelligible in conjunction with the following description of the example embodiments, which are explained in more detail in conjunction with the drawings.

For a further description of the invention, reference is made to the example embodiments of the drawings. In a schematic diagram.

DETAILED DESCRIPTION OF THE EXAMPLE EMBODIMENTS

Figure 1:
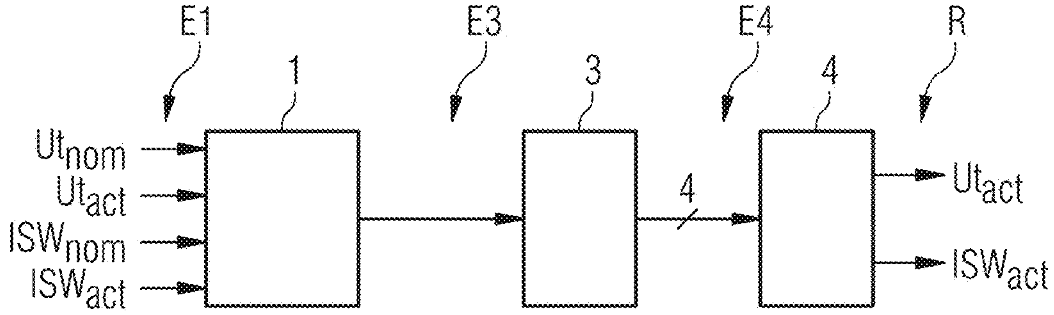
FIG. 1 shows a schematic representation of an x-ray generation system according to the prior art.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the inventive system for controlling a high voltage for x-ray applications comprises a controller which has at least one input for a mains input voltage, and one output for outputting a primary-side transformer current. The system furthermore has a distance compensation, which is suited to providing the primary-side transformer current with a predetermined pulse frequency or a predetermined pulse length.

An advantage of at least one embodiment of such a system is that a linear association between actuating variable and transformer current is essentially produced and the controller can essentially be configured as a simple PI controller. A non-linearity is compensated for by the distance compensation. As a result, the speed and the precision of the control is increased. The controller can be embodied in particular as a current controller or current-voltage controller.

A target voltage is input into the controller as a further input variable or is stored herein. Furthermore, the current output voltage of the system or a consumer connected to the system, in particular of the x-ray generation system, is again input into the controller as an actual voltage.

The corresponding output signal of the distance compensation can be used as an input signal of a downstream pulse generator for a pulse width modulation (PWM). The typical frequency of the PWMs is at 30-300 kHz. In particular, the afore-cited system is suited to an LCLC inverter with a capacitive output filter.

The controller and distance compensation can be embodied as two components which can be connected to one another or as an integrated component.

The afore-cited circuit is used to effectively suppress mains ripples. The circuit makes it possible to choose controller parameters independently of the mains voltage. It is therefore possible to find favorable control parameters even without a mains adjustment transformer.

In one embodiment, the controller further has an input for an oscillating current. Furthermore, the controller then has an input option for a target oscillating current or a target oscillating current is stored. In this embodiment, a current output oscillating current of the system or of a load connected to the system, in particular of the x-ray generation system, is again input into the controller as an actual oscillating current.

In a further embodiment, the distance compensation has at least one conversion chart.

The distance compensation expediently has a number of conversion charts and the system has a calibration mode which is suited to selecting the suitable conversion chart based upon the pulse frequency as a function of a nominal mains input voltage and a predetermined calibration transformer current. In this embodiment, the system can be used easily for different x-ray devices or different input voltages can be connected to different power supplies.

In a further embodiment, the distance compensation is arranged downstream of the controller and uses an actual voltage, an interference voltage and/or pulse length as a further input variable. An interference voltage is understood to mean the deviation of the current mains voltage from a nominal mains voltage. In particular, the afore-cited and possibly further parameters are stored in the conversion chart as parameters.

The system is expediently designed for a mains input voltage of between 380V and 480V alternating voltage and/or between 208V and 277V alternating voltage.

At least one embodiment of the inventive x-ray generation system comprises at least one embodiment of the inventive system and furthermore a pulse generator and an x-ray beam generator.

The pulse generator generates a pulse width modulation.

The x-ray beam generator of at least one embodiment comprises an x-ray tube or is connected with one such. Furthermore, the x-ray generator of at least one embodiment expediently comprises a power circuit part as described in DE 10 2014 202 954 A1 (the entire contents of which are hereby incorporated herein by reference), which comprises an inverter circuit with two bridge sections. Each of the bridge sections expediently comprises two circuits, each of which comprises a switch, a diode and a capacitor. The inverter circuit uses the signal of the pulse generator to activate switches arranged in the bridge sections. Furthermore, the x-ray beam generator comprises an oscillating circuit, the input current of which as an actual oscillating current can be used as an input variable for the inventive system. A transmission circuit and a rectifier circuit is arranged downstream of the oscillating circuit.

The x-ray generation system is expediently designed to generate a pulsed x-ray beam with a pulse duration of 1 to 100, in particular 3 to 10 ms.

The inventive method of at least one embodiment for controlling a high voltage, in particular for an x-ray beam generator, comprises:

controlling a primary-side transformer current with a controller starting from a mains input voltage and a target voltage, looking up a pulse frequency or a pulse length, and compensating for the primary-side transformer current with the looked-up pulse frequency or the downstream pulse length.

Furthermore, the current output voltage of the system or of a load connected to the system, in particular of the x-ray generation system is again entered into the controller as an actual voltage.

The looking-up process is in particular carried out in a conversion chart.

The method can further comprise:

selecting a conversion chart by reading out a pulse frequency with a predetermined calibration transformer current.

The method can further comprise inputting an oscillating current into the controller and/or a current intermediate circuit voltage, a current pulse length, a current high voltage value or a current controller control value can be used as input variables.

Figure 2:
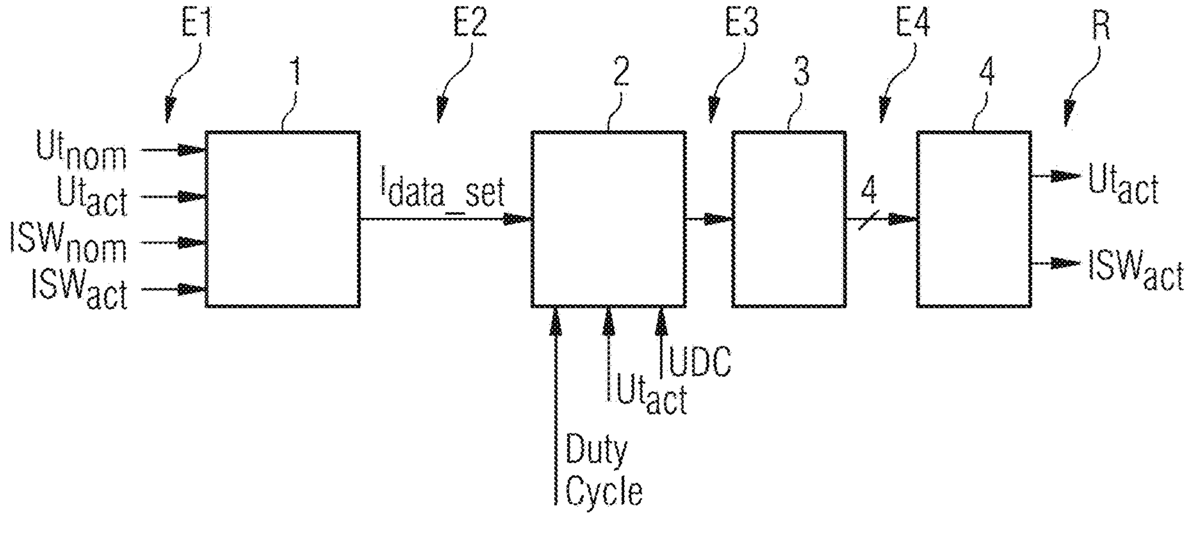
FIG. 2 shows an inventive x-ray generation system of an embodiment.

FIG. 2 shows a controller 1, which has at least one input for inputting an input variable. The input variable E1 comprises at least one nominal voltage $U_{t,nom}$ as target voltage and a current actual voltage $U_{t,act}$. Furthermore, a nominal oscillating current $Isw_{nom}$ can be selected to be a target oscillating current and a current actual oscillating current $Isw_{act}$ can be selected to be an input variable for the controller 1. The controller 1 can be a pure voltage controller or pure current controller or combined controller. The controller 1 is essentially a PI controller. A target voltage is input into the controller as a further input variable or stored herein.

The output current of the controller 1 is the input variable E2 for the distance compensation 2. The distance compensation is embodied as a conversion chart with the aid of which a pulse frequency or a pulse length can be read out as a function of an actual voltage $U_{tact}$, an intermediate voltage $U_{DC}$ or a Duty-Cycle, i.e. a pulse length. If a number of conversion charts are stored in the distance compensation 2, the suitable conversion chart can be sought out by calibration with a known current.

The output signal of the distance compensation 2 is either a pulse frequency and/or a pulse length, which move into a pulse machine 3 as an input variable E3. A pulse-width modulated signal which is input into an x-ray generator as an input variable E4 is generated with the pulse machine 3. The actual x-ray tube is connected to the x-ray generator, with the aid of which x-ray radiation is generated. The x-ray generator is designed for a high voltage of 40-150 kV, for instance. Furthermore, an output voltage is coupled again into the controller 1 as a current actual voltage Ut,act and optionally an output oscillating current as a current actual oscillating current is coupled again into the controller 1 as feedback R. The afore-cited system is suited to achieving switch-on times of at most 1 ms, because a stable high voltage of at most 1 ms is reached.

Although the invention has been illustrated and described in detail by the preferred example embodiment, the invention is not restricted by the disclosed examples and other variations can be derived herefrom by the person skilled in the art without departing from the scope of protection of the invention.

It shall be understood that the embodiments described above are to be recognized as examples. Individual embodiments may be extended by features of other embodiments. In particular, a sequence of the steps of the inventive methods are to be understood as example. The individual steps can also be carried out in a different order or overlap partially or completely in time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A system for controlling a high voltage for x-ray applications, the system comprising:

a controller including at least one input for a mains input voltage and one output for outputting a primary-side transformer current; and a distance compensation configured to compensate for a non-linearity in the system by outputting at least one of a pulse frequency or a pulse length based on the primary-side transformer current, wherein at least one output of the controller is connected to at least one input of the distance compensation.

2. The system of claim 1, wherein the controller further includes an input for an oscillating current.

3. The system of claim 1, wherein the distance compensation includes at least one conversion chart.

4. The system of claim 1, wherein the distance compensation includes a number of conversion charts, and wherein the distance compensation is configured to operate in a calibration mode for selecting a suitable conversion chart based upon the pulse frequency as a function of a target voltage and a calibration transformer current.

5. The system of claim 1, wherein the distance compensation is downstream of the controller and is configured to use at least one of an actual voltage, an interference voltage, or a pulse length as a further input variable.

6. The system of claim 1, wherein the system is configured to input the mains input voltage of at least one of between 380V and 480V alternating voltage, or between 208V and 277V alternating voltage.

7. An x-ray generation system comprising:

the system of claim 1;

a pulse generator; and an x-ray beam generator.

8. The system of claim 1, wherein the distance compensation is configured to look up the at least one of the pulse frequency or the pulse length.

9. The system of claim 1, further comprising:

a pulse machine configured to input the at least one of the pulse frequency or the pulse length from the distance compensation.

10. The system of claim 2, wherein the distance compensation includes at least one conversion chart.

11. The system of claim 2, wherein the distance compensation includes a number of conversion charts, and wherein the distance compensation is configured to operate in a calibration mode for selecting a suitable conversion chart based upon the pulse frequency as a function of a target voltage and a calibration transformer current.

12. The system of claim 2, wherein the distance compensation is downstream of the controller and is configured to use at least one of an actual voltage, an interference voltage, or a pulse length as a further input variable.

13. The system of claim 2, wherein the system is configured to input the mains input voltage of at least one of between 380V and 480V alternating voltage, or between 208V and 277V alternating voltage.

14. An x-ray generation system comprising:

the system of claim 2;

a pulse generator; and an x-ray beam generator.

15. The system of claim 9, wherein the pulse machine is configured to output a pulse width modulated signal, based on the at least one of the pulse frequency or the pulse length, to an x-ray generator.

16. A method for controlling a high voltage, the method comprising:

controlling a primary-side transformer current, with a controller, based on a mains input voltage and a target voltage; and compensating, via a distance compensation, for a non-linearity in the primary-side transformer current with at least one of a pulse frequency or a pulse length based on the primary-side transformer current, wherein at least one output of the controller is connected to at least one input of the distance compensation.

17. The method of claim 16, further comprising:

selecting a conversion chart by reading out a pulse frequency in a case of a threshold calibration transformer current.

18. The method of claim 16, further comprising:

inputting at least one of an oscillating current or a current intermediate circuit voltage into the controller, wherein at least one of a current pulse length, a current high voltage value or a current controller control value is used as an input variable.

19. The method of claim 16, wherein the method is for controlling a high voltage for an x-ray beam generator.

20. The method of claim 17, further comprising:

inputting at least one of an oscillating current or a current intermediate circuit voltage into the controller, wherein at least one of a current pulse length, a current high voltage value, or a current controller control value is used as an input variable.

* * * * *